(No Model.)
H. & G. JELINSKY.
PLOW.
No. 366,667. Patented July 19, 1887.
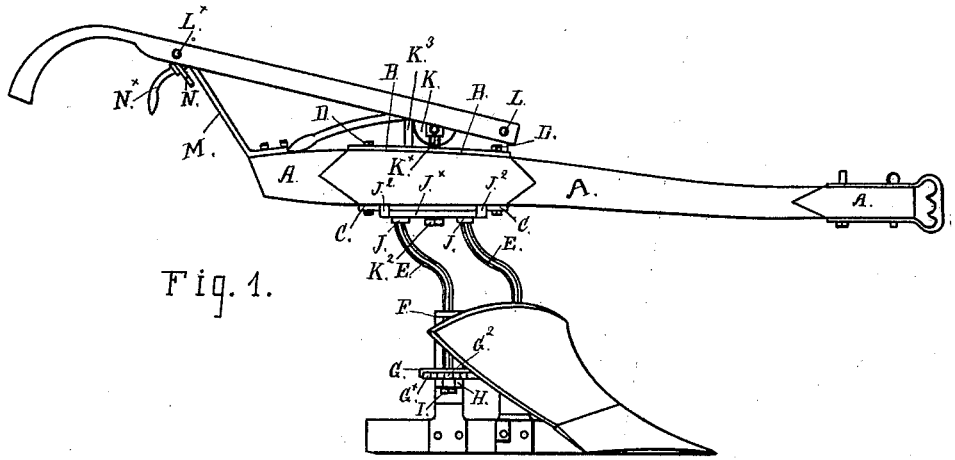
Fig. 1.
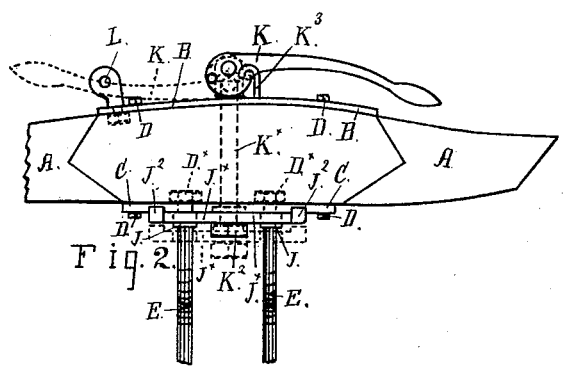
Fig. 2.
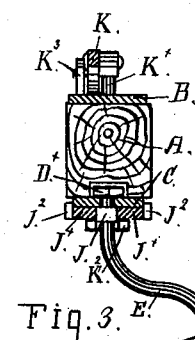
Fig. 3.
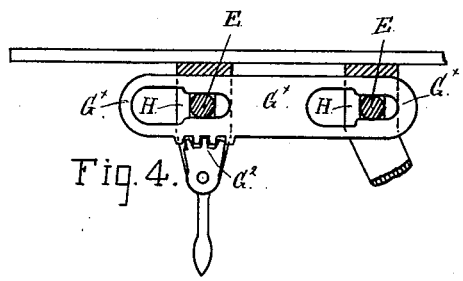
Fig. 4.
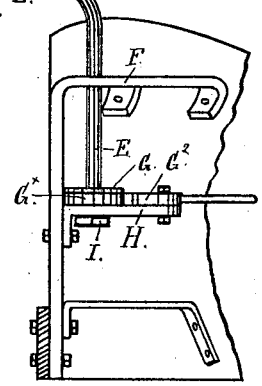
Fig. 5.
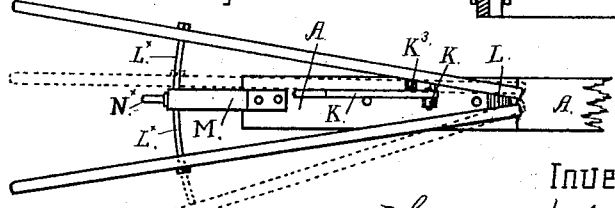
Witnesses:
Wm Mayer
Joseph E. Ford
Inventors:
Henry Jelinsky
Gustav Jelinsky
By C. W. M. Smith Atty.

UNITED STATES PATENT OFFICE.

HENRY JELINSKY AND GUSTAV JELINSKY, OF OAKLAND, CALIFORNIA.

PLOW.

SPECIFICATION forming part of Letters Patent No. 366,667, dated July 19, 1887.

Application filed January 20, 1887. Serial No. 224,940. (No model.)

*To all whom it may concern:*

Be it known that we, HENRY JELINSKY and GUSTAV JELINSKY, residing at Oakland, in the county of Alameda and State of California, have invented certain new and useful Improvements in Plows, of which the following is a specification.

Our invention relates especially to a certain new and useful construction and arrangement of devices whereby the ordinary plow is deflected or changed to a right or left position in a vertical line with the beam, and has for its object the combination in one utensil of a plow adapted for ordinary plowing, such as turning furrows to or from land and the cultivation of vines.

To attain this end our invention consists of two curved standards pivotally connected to the plow and plow-beam, whereby the plow and plow-handles are deflected or changed from a right to a left handed position with the beam. The upper ends of the curved standards are pivoted to a slotted movable plate on the lower face of the plow-beam, and are provided with nuts countersunk in the beam. Square tapering lugs are also made on the standards, which are received in corresponding slots in a movable locking-plate connected to a pin or rod passing up through the plow-beam, to which a cam-lever is attached and by which the movable locking-plate is raised or lowered from contact with the slotted plate connected to the lower face of the plow-beam. The lower ends of the curved standards are also made square, with shoulders, and pass through bent braces connected to the landside and mold-board, and pivot on their shoulders, in a movable slotted rack-plate on lugs extending from the bent braces, in such a manner that when the locking-plate is lowered and the slotted rack-plate in proper position to admit the lower end of the curved standards to be turned, the plow can be carried bodily to the right or left of the beam and firmly held in position. The handles of the plow are pivoted to the top of the beam and a bent brace is bolted to the inner end of the beam and bent around the rod by which the handles are connected, forming a sleeve, within which the rod slides when the handles are moved to the right or left, all of which, together with other details of construction and operation, will be hereinafter fully described.

The accompanying drawings, forming a part of this specification, are referred to by figures and letters.

Figure 1 is a side elevation of our combination-plow. Fig. 2 is a side view of part of beam, showing arrangement for changing position of plow. Fig. 3 is a cross-section showing the plow in position to turn furrow to or from land. Fig. 4 is a plan or top view of movable slotted rack-plate, pawl, or ratchet. Fig. 5 is a plan or top view of handle of plow. The dotted lines indicate position of handles in plowing to or from land.

A is the beam of the plow, to the upper and lower faces of which are bolted the plates B and C, the latter being slotted for side adjustment by loosening the nuts D upon the top plate B, and thus the end of the beam can be deflected independent of the plow.

To the plate C are pivoted the curved standards E, which extend downward through the right-angled arms of the brace F, bolted to the landside and inner face of the mold-board of the plow, and from thence, through an inverted dished-plate sand-guard, G, and slotted rack-bar $G^\times$, to the arms or lug H, to which they are connected by the nuts I I.

The upper ends of the curved standards pivot in the plate C upon nuts $D^\times D^\times$, countersunk in the beams, and shoulders are formed by the enlarged downwardly-tapering lugs J J. On the lower ends of the curved standards are the nuts I I, and said standards are thus arranged so as to swivel when the locking-plate $J^\times$, provided with slots corresponding with the tapering lugs of the standards, is lowered. This locking-plate is operated by a cam-lever, K, at the top of the plow-beam, which connects with the bolt $K^\times$, that passes through the plow beam and plates B C and holds the locking-plate in position by the nut $K^2$, and when the cam-lever is thrown forward the locking-plate is lowered away from the square ends of the curved standards, and when reversed the locking-plate will be drawn upward against the face of the plate C, and the square slots engage the square ends of the standards, and the lugs J² embrace the edges of plate C, and thus prevent lateral movement of the plate J˟ or the turning of the standards.

The cam-lever has its fulcrum upon a hooked standard or post, K³, connected to the plate B. The lower ends of the curved standards are also made square and fit into the square shouldered slots of the movable plate G˟ when locking the lower end of the curved standards, and when unlocking the lower end of these the plate G˟ is moved forward by the pawl and rack G², which throws the square ends of the standard from the square shouldered slots into the rounded slots, the two being connected, and permits the lower ends of the standards to be moved in common with the upper ends.

The forward ends of the plow-handles are pivoted to the beam, as at L, and a bent bar, M, is bolted to the outer end of the beam and extends up and around the rod L˟, which connects the two handles to form a spring clamp or loop, N, and this spring clamp is tightened or loosened upon the rod by a screw arm or handle, N˟, and holds the handles in position at the desired angle with the beam.

In order to deflect the plow to the right or left of the beam, the cam-lever is thrown forward a full stroke, resting in the crotch of the handles, which movement lowers the locking-plate away from the square or tapering lugs at the ends of the curved standards, at the same time the rack-plate G˟ is moved backward by the pawl engaging the teeth of the rack, which throws the square lower ends of the curved standards into the rounded extension-slots of the rack-plate and permits the plow to be deflected or carried bodily to the right or left of the beams, the curved standards operating by a sort of half-universal movement, in which position the cam-lever is drawn backward upon its fulcrum and the pawl G˟ thrown forward against the mold-board of the plow, which movements raise the locking-plate against the plate C and carry the slotted rack-plate forward, so that the square lower ends of the curved standards will engage with square shouldered extension-slots of the rack-plate and hold the plow firmly in its changed position with the curvature of the standards at right angles with the plow-beam, as shown in Fig. 3. In this deflected position of the plow the handles are moved so as to be in a true horizontal and vertical line with the plow-beam by unscrewing the hand-lever of the loop N, which permits the handles to be moved on the connecting-rod L˟, and thus a close approach can be made with the plow-beam and handles to vines without doing material injury to them.

It should here be observed, however, that the position of the handles can be changed irrespective of the position of the plow.

When the plow is in position for ordinary plowing, the curved standards will be bent forward or in alignment with the beam, as shown in Fig. 1, and the position of the handles changed, so as not to project beyond the line of the beam and landside.

It will thus be seen that the elements of an ordinary plow and vineyard-plow are combined in one and the same utensil, and by its use a near approach to plants or vines for turning the soil to or away from the hills without damage to the fronds or branches can be made.

Having thus described our invention, what we claim, and desire to secure by Letters Patent, is—

1. The combination, with the beam and curved standards, of the locking-plate J˟, having slots adapted to receive the square shoulders of the curved standards and lugs or arms to prevent side movements, the bolt passing through the plow-beam and said locking-plate J˟, and the cam-lever at the top of the plow-beam for operating the bolt, as described.

2. The combination, with the curved standards E E and the mold-board provided with sustaining arms or lugs, of the plate G˟, provided with rack-teeth and the combined square and rounded slots, as shown, and the pawl for operating the same, substantially as described.

3. In a plow, the combination, with the curved standards pivotally connected to the plow-beam and also pivotally connected to the plow-body, of the handles pivoted to the top of the plow-beam and adapted for side movement in a spring loop or sleeve upon the connecting-rod L˟, formed at the end of the bent arm or standard M, as described.

4. The combination, in a plow, of the curved standards E E, the deflecting-plate C, and locking-plate J˟, the former made movable upon the bolts passing through the beam and the latter operated by a bolt also passing through the beam, the cam-lever upon the top of the beam, the handles pivoted at the top of the beam and having a supporting-arm locked around a connecting-rod and adapted to be moved to the right or left on a horizontal plane with the sides of the beam, as described, and the variable slotted rack-plate, in which the lower ends of standards turn, said plate being operated by the pawl connected to one of the arms of the curved braces, as specified.

In testimony that we claim the foregoing we have hereunto set our hands and seals.

HENRY JELINSKY. [L. S.]
GUSTAV JELINSKY. [L. S.]

Witnesses:
C. W. M. SMITH,
CHAS. E. KELLY.